US010764027B2

(12) United States Patent
Huang et al.

(10) Patent No.: US 10,764,027 B2
(45) Date of Patent: Sep. 1, 2020

(54) DETERMINISTIC CALIBRATED SYNCHRONIZED NETWORK INTERLINK ACCESS

(71) Applicant: Cisco Technology, Inc., San Jose, CA (US)

(72) Inventors: Chih-Tsung Huang, San Jose, CA (US); Wei-Jen Huang, San Jose, CA (US); Kelvin Chan, San Jose, CA (US); Keerthi Manjunathan Swarnamanjunathan, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 333 days.

(21) Appl. No.: 15/204,937

(22) Filed: Jul. 7, 2016

(65) Prior Publication Data
US 2018/0013541 A1 Jan. 11, 2018

(51) Int. Cl.
*G06F 15/16* (2006.01)
*H04L 7/00* (2006.01)
(Continued)

(52) U.S. Cl.
CPC .......... *H04L 7/0033* (2013.01); *H04J 3/0682* (2013.01); *H04L 7/0012* (2013.01); *H04L 43/0864* (2013.01); *H04J 3/0697* (2013.01)

(58) Field of Classification Search
CPC . H04L 7/0033; H04L 7/0012; H04L 43/0864; H04J 3/0682; H04J 3/0697
(Continued)

(56) References Cited

U.S. PATENT DOCUMENTS 6,810,426 B2 10/2004 Mysore et al.
7,535,932 B2 * 5/2009 Ishii ...................... H04W 48/12
370/329
(Continued)

FOREIGN PATENT DOCUMENTS

EP 1608112 12/2005

OTHER PUBLICATIONS

International Search Report and Written Opinion from the International Searching Authority, dated Sep. 21, 2017, 13 pages, for the corresponding International Application No. PCT/US2017/039206.
(Continued)

*Primary Examiner* — Thoung Nguyen
(74) *Attorney, Agent, or Firm* — Polsinelli PC

(57) ABSTRACT

Technologies for calibrated network interlink access. In some embodiments, a system can calculate a first communication latency of a first link between a first processing element in a first switch and a second processing element in a second switch, and a second communication latency associated with a second link between the first processing element and a third processing element in a third switch. The system can determine a delta between the first communication latency and the second communication latency, and whether respective clock rates of the first switch, second switch, and third switch have a clock rate variation, to yield a clock rate variation determination. Based on the delta and clock rate variation determination, the system can determine an offset value for synchronizing the first communication latency and second communication latency. Based on the offset value, the system can calibrate traffic over the first link and/or the second link.

20 Claims, 8 Drawing Sheets

(51) Int. Cl.
*H04J 3/06* (2006.01)
*H04L 12/26* (2006.01)

(58) Field of Classification Search
USPC ......... 709/248, 465; 370/328, 465, 509, 252
See application file for complete search history.

(56) References Cited

U.S. PATENT DOCUMENTS

| | | |
|---|---|---|
| 8,274,891 B2 | 9/2012 | Averi et al. |
| 8,452,846 B2 | 5/2013 | Fredette et al. |
| 2004/0225970 A1* | 11/2004 | Oktem .................. G06F 17/505 716/114 |
| 2006/0029016 A1* | 2/2006 | Peles ..................... H04L 43/022 370/328 |
| 2008/0055485 A1* | 3/2008 | Elnathan ................... H03L 7/06 348/723 |
| 2008/0205439 A1* | 8/2008 | Li ....................... H04L 25/0272 370/465 |
| 2010/0329125 A1 | 12/2010 | Roberts et al. |
| 2011/0102353 A1* | 5/2011 | Kim ........................ G06F 3/041 345/173 |
| 2011/0170860 A1* | 7/2011 | Smith ................... H04J 3/0682 398/25 |
| 2013/0101006 A1* | 4/2013 | Mombers .................. G06F 1/10 375/226 |
| 2013/0101068 A1* | 4/2013 | Mombers .................. H03L 7/18 375/316 |
| 2013/0148956 A1 | 6/2013 | Khotimsky et al. |
| 2013/0191486 A1* | 7/2013 | Someya ................ H04J 3/0667 709/208 |
| 2015/0063132 A1* | 3/2015 | Dunlap ............... H04L 43/0852 370/252 |
| 2015/0319209 A1 | 11/2015 | Lida et al. |
| 2018/0013541 A1* | 1/2018 | Huang .................. H04L 7/0012 |

OTHER PUBLICATIONS

Yu, Minlan et al, "Latency Equalization as a New Network Service Primitive", IEEE/ACM Transactions on Networking, May 27, 2011, pp. 125-138, vol. 20, Issue: 1, Feb. 2012, IEEE.

* cited by examiner

DETERMINISTIC CALIBRATED SYNCHRONIZED NETWORK INTERLINK ACCESS

TECHNICAL FIELD

The present technology pertains to managing communication latencies in data centers, and more specifically to synchronizing and calibrating network communications to account for interlink latencies and conditions.

BACKGROUND

Multi-tenant cloud data centers have grown exponentially in recent years as enterprises increasingly move to cloud computing solutions. Moreover, increasing customer demands and competition have prompted higher levels of fairness scrutiny from cloud customers, particularly financial customers and service providers. For example, the relative amount of service throughput and latency received by financial institutions can have a significant impact on those institutions. Indeed, service latency variations between customers as low as sub-microsecond or even sub-hundred nano second can have a financial impact for those customers, particularly when conducting time-sensitive activities, such as stock trading. Accordingly, the ability to provide service fairness to customers and greater control over relative latencies can have an enormous impact on customer service and cloud computing as a whole.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
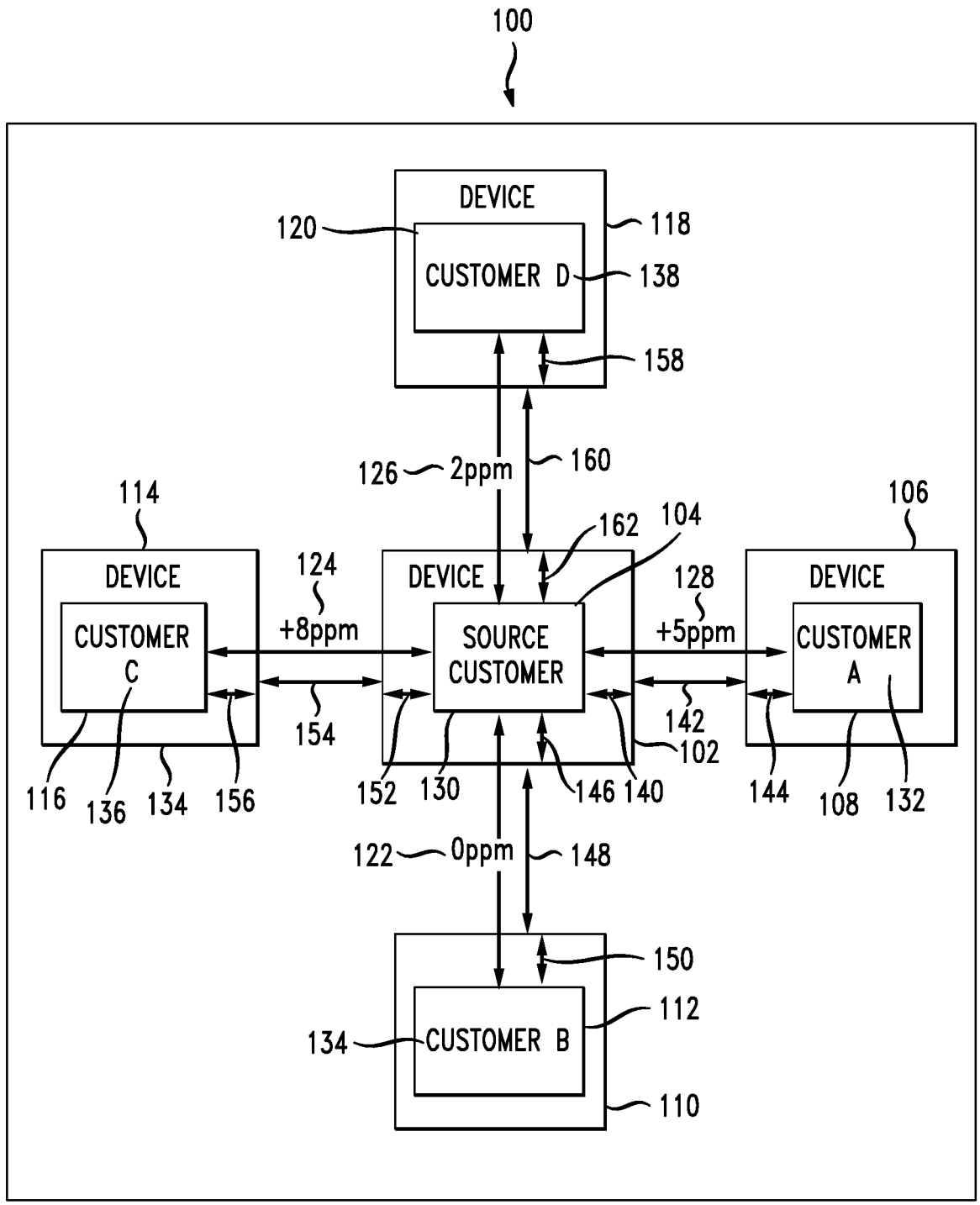
FIG. 1A illustrates a schematic diagram of an example network architecture with interconnections between network devices and clock rate variations between the interconnections.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to provide deterministic, calibrated synchronized network interlink access for customers or entities. For example, the approaches herein can be used to match latencies in communications between customers to achieve service fairness for those customers. The calibration can synchronize or account not only for latencies on links between the customer's network devices, such as the customer's switches or routers, but also latencies on links between internal components within the customer's network devices, such as a switches' ingress/egress port(s) and the switches' ASIC (application specific integrated circuit). The calibration can also account for any variations in the clock rates of clocks used by the various network devices. This can provide greater precision to the calibration.

The approaches herein can also be used to provide differentiated services (e.g., premium, basic, best effort, etc.) on throughput and latency, and may offer opportunities for customer service tier levels and diversifying revenue. The differentiated services can define different levels of performance, which can be based on corresponding service agreements.

Disclosed are systems, methods, and computer-readable storage media for deterministic, calibrated, and synchronized network interlink access. In some examples, a system can calculate a first communication latency associated with a first link between a first processing element (e.g., ASIC) in a first network device (e.g., switch or router) and a second processing element in a second network device, and a second communication latency associated with a second link between the first processing element and a third processing element in a third network device. The first, second, and third processing elements can be internal components respectively within the first network device, the second network device, and the third network device. For example, the first, second, and third processing elements can include circuits, such as ASICs; controllers; processors; processing engines; etc.

In some cases, the first and second communication latencies can be based on the round-trip time of communications between the first processing element in the first network device, the second processing element in the second network device, and the third processing element in the third network device. Further, in addition to calculating the first and second latencies, the system can determine an average latency, a minimum latency, a maximum latency, a standard deviation, etc. Moreover, the first and second communication latencies can be calculated based on the average latency, a current latency, a median, a standard deviation, etc.

Next, the system can determine a delta between the first and second communication latencies. For example, the system can compare the first and second communication latencies and determine a difference between the first and second communication latencies.

The system can also determine whether respective clock rates associated with the first network device, the second network device, and the third network device have one or more clock rate variations, to yield a clock rate variation determination. For example, the first network device, the second network device, and the third network device can have internal clocks, such as a crystal oscillator clock, which the network devices can use to determine local time. The system can analyze the internal clocks to identify any variations in the clock rates (e.g., frequencies) of the clocks.

Next, based on the delta between respective first and second latencies and the clock rate variation determination, the system can determine one or more offset values for synchronizing the respective first and second latencies. The offset value can define specific settings for delaying associated traffic in order to harmonize or equalize the first and second communication latencies.

Based on the one or more offset values, the system can calibrate traffic over one or more of the first and second links. The calibration can include delaying traffic over one or more of the first and second links. The system can calibrate input traffic as well as output traffic. This can ensure that incoming and/or outgoing communications over all of the first and second links experience the same or substantially the same latency.

In some examples, the first link and the second links can include respective sub-links, which can include the respective port-to-port link between network devices (e.g., link connecting the port on the first network device with the port on the second network device, and link connecting the port on the first network device with the port on the third network device), as well as the respective internal link between the ports on each network device and the processing element on each network device.

For example, the first link can include link A connecting the port on the first network device to the port on the second network device, as well as link B connecting the port on the first network device to the first processing element on the first network device and link C connecting the port on the second network device to the second processing element on the second network device. Here, we can refer to link A as the "external link" and links B and C as the "internal links" which together make up the first link. Similarly, the second link can include link D connecting the port on the first network device to the port on the third network device, as well as link B connecting the port on the first network device to the first processing element on the first network device and link E connecting the port on the third network device to the third processing element on the third network device. Here, we can refer to link D as the "external link" and links B and E as the "internal links" which together make up the second link.

By segmenting the links into external and internal sub-links, we can calculate, account for, and adjust the latencies not only of the external connections between network devices and customers, but also the internal connections within the network devices of the customers. This can be advantageous in many scenarios. For example, in some cases, the external links between customers (i.e., link between ports of the customer's network devices) can be harmonized by assuring that the length of the medium interconnecting the network devices (e.g., wire) is substantially the same and/or the material or type of medium interconnecting the network devices is the same or equivalent. This can help ensure that the latencies experienced by the external connections between customers is substantially the same. However, the internal connections within the respective network devices of the customers can create variations or fluctuations in latencies even if the latencies between the external connections are equalized by, for example, ensuring that the external connections are based on the same type or material of media and/or the same length of media. Thus, by including the sub-link latencies into consideration, we can account for latencies stemming from both external connections and internal connections.

To illustrate, based on our previous example, if links A and D, which respectively provide the external links between the first network device and the second network device as well as the first network device and the third network device, are made up of the same type of media cut to the same length, then the latencies of the external links (i.e., links A and D) between the first and second network devices as well as the first and third network devices can be substantially equalized. However, the first link between the first network device and the second network device may still experience greater latencies than the second link due to greater latencies in the internal links, links B and/or C.

Thus, to equalize the latencies between the first link and the second link, we can identify the deltas generated by the internal links associated with the first link (i.e., links B and C) and the internal links associated with the second link (i.e., links B and E). We can then equalize the latencies by identifying an offset value and calibrating the traffic based on the delta for the internal links. The offset value and the calibrations can generally be applied to the faster internal links based on the slower internal links. For example, if the internal links for the second link have a 1 s lower latency than the internal links for the first link, then we can increase the latency of the second link by 1 s to harmonize the total latencies experienced by the first and second links.

DESCRIPTION

The technologies herein address the need in the art for increased service fairness as well as performance calibration and synchronization. Disclosed are systems, methods, and computer-readable media for deterministic, calibrated, and synchronized network interlink access and communications. The disclosure begins with a discussion of link latencies and clock rate variations. A more detailed discussion of techniques for deterministic, calibrated, and synchronized network interlink access and communications will then follow. The disclosure will finish with a description of example network and computing systems and devices.

The disclosure now turns to FIG. 1A, which illustrates a schematic diagram of an example network architecture 100 with interconnections between network devices and clock rate variations between the interconnections. The architecture 100 includes switches 102, 106, 110, 114, 118 interconnected via switch 102. Switch 102 can be connected to the other switches 106, 110, 114, 118, and may serve as a bridge between the other switches 106, 110, 114, 118, and/or a source of data for the other switches 106, 110, 114, 118.

The switches 102, 106, 110, 114, 118 can be part of a same network or datacenter, such as a cloud data center; a same system, such as a system with multiple switches or components; a same cluster of switches and/or network devices; or one or more different networks or data centers. Moreover, the switches 102, 106, 110, 114, 118 may be interconnected via one or more cables or media, such as one or more fiber optic cables, copper cables, wireless connections, Ethernet cables, and/or any other fiber, electrical, or wireless media. Further, the switches 102, 106, 110, 114, 118 can be directly or indirectly connected. For example, the links between the switches 102, 106, 110, 114, 118 can include one or more hops, nodes, devices, networks, components, and/or paths.

The switches 102, 106, 110, 114, 118 can include processing elements 104, 108, 112, 116, 120. The processing elements 104, 108, 112, 116, 120 can include a circuit, such as an application specific integrated circuit (ASIC); a controller, such as a baseboard management controller; a processor; a software module; software code; etc. Moreover, the processing elements 104, 108, 112, 116, 120 can be associated with respective customers 130-138. For example, processing element 104 can be associated with Source Customer, processing element 106 can be associated with Customer A, processing element 106 can be associated with Customer B, processing element 112 can be associated with Customer C, and processing element 120 can be associated with Customer D. To this end, the processing elements 104, 108, 112, 116, 120 can be configured to provide data and/or services for, and/or of, the associated customers 130-138, as well as their respective clients. For example, the processing elements 104, 108, 112, 116, 120 can be configured to support financial transactions and process financial data for specific financial institutions or banks (e.g., Source Customer and Customers A-D), as well as their respective clients.

The customers A-D (132-138) can be interconnected via source customer 130. Source customer 130 can serve as a source of data and/or services to the other customers, customers A-D (132-138). For example, source customer 130 can be data or service source, such as data or information provider which provides data to other entities or customers, and customers A-D (132-138) can be financial institutions, which receive data from the source customer 130. As another example, source customer 130 can be an Internet service provider, and customers A-D (132-138) can be Internet clients or companies. Other examples are also contemplated herein, as these examples are merely non-limiting examples provided for the sake of clarity and explanation.

Furthermore, the switches 102, 106, 110, 114, 118 and/or processing elements 104, 108, 112, 116, 120 can include internal clocks configured to maintain local time. Normally, the internal clocks of devices can have minor variations in the clock rates (e.g., frequency), which can be caused by one or more factors such as age, temperature, etc. In some examples, clock rate variations can be described as parts per million (PPM). Some systems and standards can set a maximum or threshold clock rate variation. For example, the ETHERNET standard allows a maximum of +/−100 PPM variance over time.

Clock rate variations can cause discrepancies in latency and performance. For example, for a 10 Gbps link of 64 bytes frame, each PPM variation in clock rates may translate to 14.88 packets per second increase or decrease. In FIG. 1, the links 122-128 between customers 130-138 can have clock rate variances. For example, link 128 between switch 102 and switch 106 can have a +5 PPM clock rate variance, link 122 between switch 102 and switch 110 can have a 0 PPM clock rate variance, link 124 between switch 102 and switch 114 can have a +8 PPM clock rate variance, and link 126 between switch 102 and switch 118 can have a −2 PPM clock rate variance. The clock rate variances can result in specific decreases or increases in packets per second for communications between the switches 102, 106, 110, 114, 118.

Moreover, the links 122-128 can include sub-links 140-162. The sub-links 140-162 can include the "external" portion of the links 122-128 or the "external links" within the links 122-128, which can include the link between network devices 102, 106, 11, 114, 118 (e.g., link between the egress/ingress ports of the network devices 102, 106, 11, 114, 118), as well as "internal" portions or links of the links 122-128, which can include the links between the ingress/egress ports on the network devices 102, 106, 110, 114, 118, and the processing elements 104, 108, 112, 116, 120 on the same network devices 102, 106, 11, 114, 118.

For example, link 122 between network device 102 and network device 110 can include sub-links 146-150. Here, sub-link 148 can be the link connecting the ingress/egress port on network device 102 with the ingress/egress port on network device 110. This can be referred to as the "external link", as at least a portion of the link is outside of the network devices 102, 110. Sub-link 146 can be the link connecting the ingress/egress port on the network device 102 with the processing element 104 on the network device 102. Moreover, sub-link 150 can be the link connecting the ingress/egress port on the network device 110 with the processing element 112 on the network device 110. Sub-links 146, 150 can be referred to as the "internal links", as at least a portion of the links is inside of the network devices 102, 110.

Links 124-128 can similarly include sub-links (i.e., links 140-144, 152-162) which can include "external links" (i.e., links 142, 154, 160) and "internal links" (i.e., links 140, 144-146, 150-152, 156-158, 162). The external links 142, 148, 154, 160 can each include one or more hops and/or media, such as a fiber cable and/or a copper cable, for example. The latency of the "external links" 142, 148, 154, 160 can be at least in part based on the material of the media use to establish the link 148 and/or the length of the media and/or link. In some configurations, the latencies between the "external links" 142, 148, 154, 160 can be harmonized or significantly equalized by adjusting the length and/or material of the media for establishing suck links. For example, the latency of the "external links" 142, 148, 154, 160 can be significantly equalized by implementing fiber and/or copper cables of the same length to establish connections. To illustrate, the links 142, 148, 154, 160 can be established using copper cables of X length, which can yield substantially equivalent latencies for all of the "external links" 142, 148, 154, 160.

The "internal links" 140, 144-146, 150-152, 156-158, 162 can include the internal connections between the ingress/egress port on a device and the processing element on that device. Thus, the "internal links" can include the electrical connection (e.g., bus, interface, etc.) between a device's port and processing element. The latencies between the "internal links" 140, 144-146, 150-152, 156-158, 162 can vary based on many factors, such as type of bus, type of switch, form factor, type of processing element, location of internal components, configuration of internal components, etc. Thus, even if the latencies of the "external links" 142, 154, 160 within the links 122-128 are equalized (e.g., by adjusting length and/or type of media used interconnections), the overall latencies experienced by the links 122-128 may still vary based on variations between the latencies of the "internal links" within the links 122-128.

The approaches disclosed herein can thus equalize or harmonize the latencies between links 122-128 by not only accounting for the latencies associated with the "external links" 142, 154, 160, but also the latencies associated with the "internal links" 140, 144-146, 150-152, 156-158, 162.

Thus, the approaches set forth herein can be used to equalize, harmonize, and/or calibrate the total latencies of the links 122-128 as desired, even when latency variations exist within "internal links" 140, 144-146, 150-152, 156-158, 162 and/or "external links" 142, 154, 160.

Figure 1B:
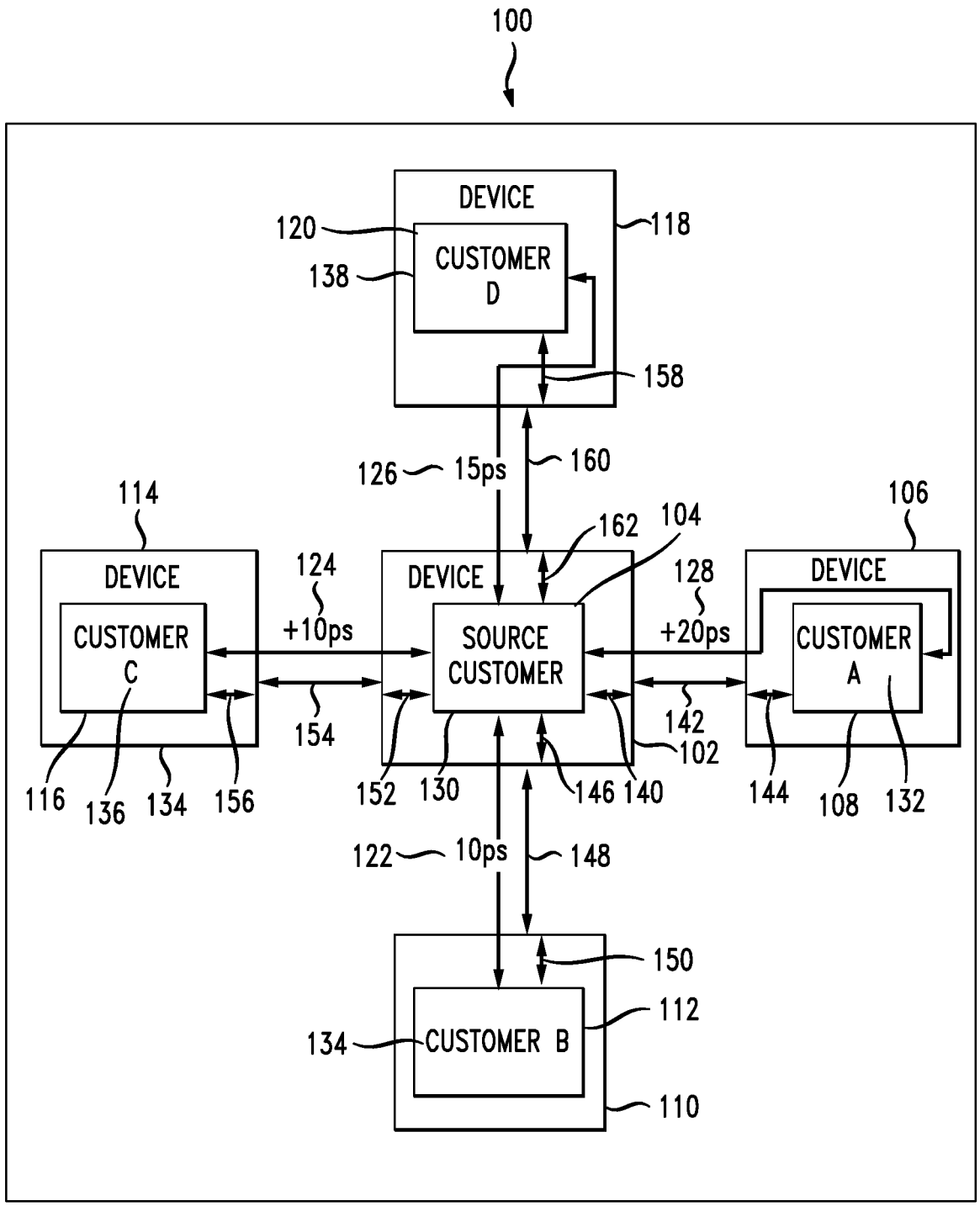
FIG. 1B illustrates a schematic diagram of an example network architecture with interconnections between network devices and latencies between the interconnections.

Referring to FIG. 1B, the links 122-128 between customers 130-138 can have respective latencies. For example, link 128 between switch 102 and switch 106 can have a +20 ps (picoseconds) latency, link 122 between switch 102 and switch 110 can have a +10 ps (picoseconds) latency, link 124 between switch 102 and switch 114 can have a +10 ps (picoseconds) latency, and link 126 between switch 102 and switch 118 can have a 15 ps (picoseconds) latency. The latencies can be based on the combined latencies of any sub-links within the links 122-128, including "internal links" 140, 144-146, 150-152, 156-158, 162 and "external links" 142, 154, 160.

As shown, some links 122-128 can have higher or lower latencies. The differences in latencies can exist even if the latencies of the "external links" 142, 154, 160 in the links 122-128 are all harmonized or equalized by, for example, matching the type(s) and/or lengths of the media used in the "external links" 142, 154, 160 to connect the network devices from port to port. For example, the different latencies can be a result of latency variations associated with the "internal links" 140, 144-146, 150-152, 156-158, 162 within the links 122-128.

The different latencies between customers can result in unfairness. Accordingly, customers with greater latencies may want to have calibrated communications so that all customers can achieve the same latency levels.

As further described below, communications over the links 122-128 can be calibrated with great precision to ensure that all of the communications over the links 122-128 experience the same, or substantially the same, latency for increased fairness. For example, communications over links 122-126 can be delayed to yield a +20 ps latency, as is the case with link 128, for links 122-126. This can ensure that all of the links 122-128 operate with the same latency (e.g., +20 ps).

Figure 2:
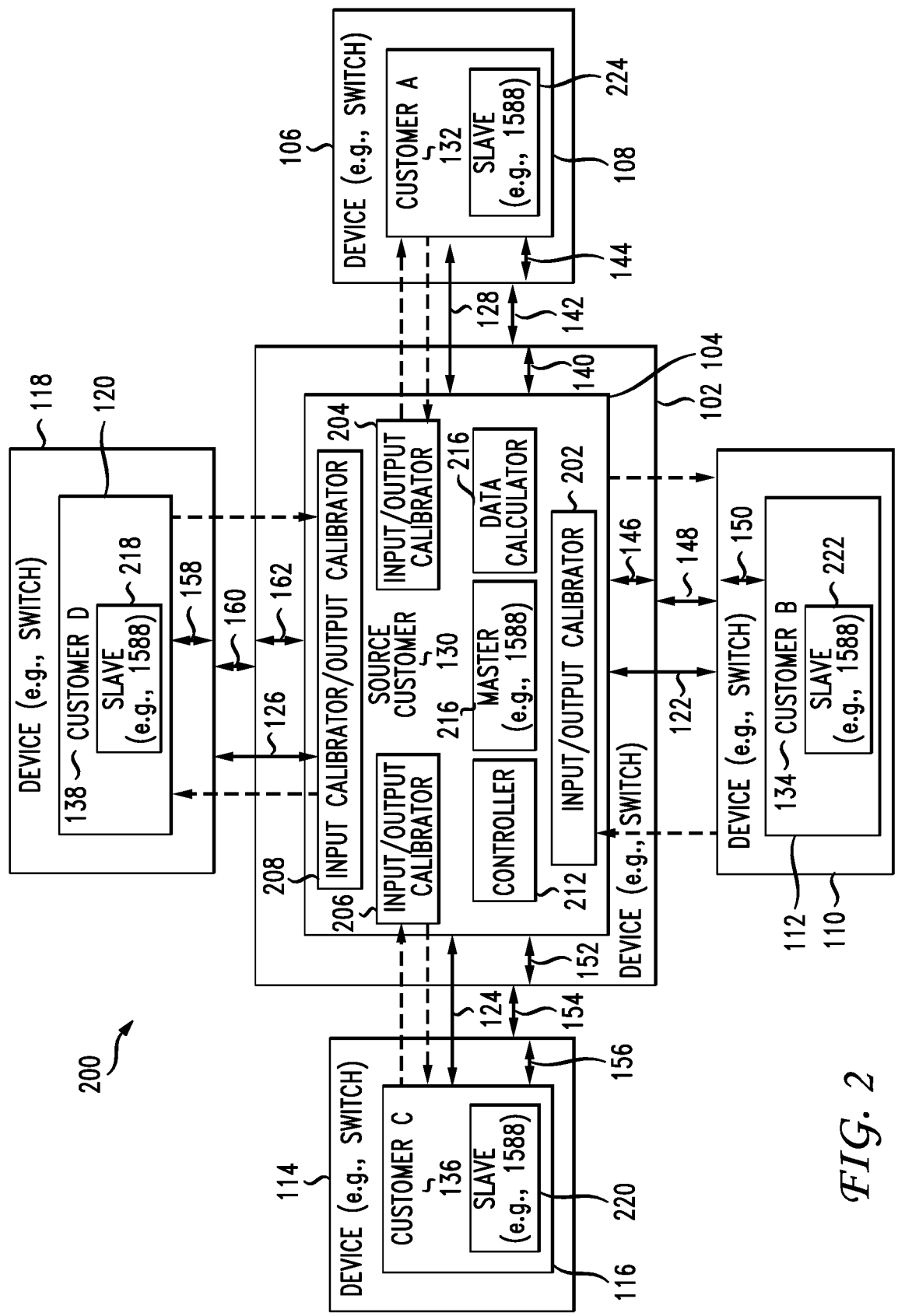
FIG. 2 illustrates a schematic diagram of an example network architecture for deterministic calibrated and synchronized interlinks between network devices.

FIG. 2 illustrates a schematic diagram of an example network architecture 200 for deterministic calibrated and synchronized interlinks between network devices. Customers A-D (132-138) can be interconnected through source customer 130 and via links 122-128. As previously indicated, links 122-128 can include "internal links" 140, 144-146, 150-152, 156-158, 162 as well as "external links" 142, 154, 160. Moreover, links 122-128 can have variations in latency, which can be attributed to the "internal links" 140, 144-146, 150-152, 156-158, 162 and/or the "external links" 142, 154, 160. Accordingly, the source customer 130 can be configured to perform latency, clock, and clock rate calibration and/or synchronization, as further explained below.

The processing element 104 of source customer 130, which resides on switch 102, can include a delta calculator 214. The delta calculator 214 on the processing element 104 can include one or more modules, software programs or code, firmware, logic components, etc., for calculating latency and/or clock rate variations and statistics. The delta calculator 214 can calculate the round-trip time (RTT) for communications over the links 122-128 to determine latency parameters/conditions, as well as other performance statistics (e.g., packet loss, throughput, activity levels, etc.). The RTT over the links 122-128 can include the time or latency attributed to each of the "internal links" 140, 144-146, 150-152, 156-158, 162 as well as the "external links" 142, 154, 160.

The delta calculator 214 can compute the average latency and/or RTT for each link, the maximum latency and/or RTT for each link, the minimum latency and/or RTT for each link, a standard deviation for each link, etc. Such calculations can include the calculations for each of the "internal links" 140, 144-146, 150-152, 156-158, 162, the "external links" 142, 154, 160, as well as the combined calculation for all links within the links 122-128.

The delta calculator 214 can also compare the latency and/or RTT calculated for each link to determine the delta latency or RTT between the various links 122-128. The delta latency or RTT can vary based on the calculations associated with the "internal links" 140, 144-146, 150-152, 156-158, 162 and the "external links" 142, 154, 160 of the links 122-128. In some cases, the delta latency or RTT may largely depend on the latencies and RTTs of the "internal links" 140, 144-146, 150-152, 156-158, 162 of the links 122-128. For example, if the latencies or RTTs of the "external links 142, 154, 160 are harmonized or equalized (e.g., by adjusting the type and/or length of associated media), then any variations between the latencies or RTTs of the links 122-128 will be mostly or even entirely based on the variations associated with the "internal links" 140, 144-146, 150-152, 156-158, 162 associated with the links 122-128.

The delta calculator 214 can periodically update the calculations, including the deltas, to keep the data current. When calculating latency, RTT, and/or deltas, the delta calculator 214 can perform multiple tests or collect multiple results for use in the calculations. This can affect the accuracy of the calculations. For example, the delta calculator 214 can compute the average RTT for a link and/or sub-link based on, for example, 20 RTT values obtained for that link or sub-link over a period of time.

The delta calculator 214 can also calculate clock rate variations between ports and/or devices 102, 106, 110, 114, 118. For example, the delta calculator 214 can detect the respective clock rates of each of the devices 102, 106, 110, 114, 118 and/or each port on each of the devices 102, 106, 110, 114, 118. The delta calculator 214 can then compare the different clock rates to determine clock rate variations between the respective clocks of the devices 102, 106, 110, 114, 118 and/or the ports of the devices 102, 106, 110, 114, 118.

The delta calculator 214 can obtain measurements and/or data for each clock and calculate the average clock rate and/or clock rate variation, the maximum clock rate and/or clock rate variation, the minimum clock rate and/or clock rate variation, and/or a standard deviation. The delta calculator 214 can compare any of the calculated values for a clock with those of any of the other clocks. For example, the delta calculator 214 can compare the respective average clock rate, maximum clock rate, minimum clock rate, and standard deviation of each of the clocks of the devices 102, 106, 110, 114, 118 and/or the ports of the devices 102, 106, 110, 114, 118, to ascertain clock rate deltas as well as other relative clock rate statistics.

The controller 212 can collect the data and calculations from the delta calculator 214, including any RTT, latency, and clock rate variation data and calculations. In some examples, the controller 212 can be an application policy infrastructure controller (APIC). For example, the controller 212 can be an APIC configured to perform automation and management operations in a software defined network (SDN) or application centric infrastructure (ACI) associated with the architecture 200.

The controller 212 can use the data, including the respective latency deltas and clock rate deltas, to program or calibrate the input/output calibrators 202-208. For example, the controller 212 can program a starting value for each of the links 122-128. The starting value can be defined to create a latency equilibrium point between the various links 122-128, which would result in a latency delta between the links 122-128 of zero (0) or substantially close to zero (0). Thus, each of the links 122-128 will be set to have the same levels of latency, unless the input/output calibrators 202-208 are further configured to implement differentiated services for one or more customers, as further explained below. The starting value can yield latency equilibrium or uniformity by delaying communications over one or more links 122-128 to ensure that all of the links 122-128 experience the same amount of latency. The amount of delay for any particular link can be based on the latency delta and clock rate delta or variation between the various links 122-128 and devices 102, 106, 110, 114, 118.

For example, if Link A has a 5 s latency and Link B has a 7 s latency, the controller 212 can program the input/output calibrator of Link A to delay communications as necessary to yield a 7 s latency at Link A. As a result, Link A and Link B will both have a matching latency of 7 s. When delaying the communications, the input/output calibrator can take into account the clock rates at Link A and/or Link B to ensure any delays in communications will yield a synchronized or equal latency across the Links A and B.

The input/output calibrators 202-208 can calibrate input and output communications as necessary to maintain matching or substantially similar latencies across the links 122-128. The calibration can adjust and account for the latency generated at every segment of the links 122-128, including the "internal" segments (i.e., links 140, 144-146, 150-152, 156-158, 162) and "external" segments (i.e., 142, 154, 160).

For example, the latency of the "external" segment of link 122 from the switch 102 to switch 110 (i.e., link 148) can be controlled by adjusting the length of the cable(s) interconnecting the switches 102, 110. However, simply adjusting the length of the cables associated with the "external" segment 148 may not account for any latencies generated by the segments that are internal to the switches 102, 110 (i.e., "internal" segments 146, 150), such as the electrical connection/communication between each switches' port and the processing element inside of each switch. The input/output calibrator 202, however, can calibrate communications on link 122 to account not only for any latencies resulting from the "external" segment 148 (e.g., the connection between the ports on switches 102, 110), but also the "internal" segments 146, 150, which can include the electrical connections/communications inside of the switches 102, 110.

For example, assume the "external" segment 148 of link 122 that connects the switches 102, 110 has a 5 s latency, the "internal" segment 150 from the port on switch 110 to the processing element 112 on switch 110 has a 1 s latency, and the "internal" segment 146 from the port on switch 102 to the processing element 104 on switch 102 has a 2 s latency. Accordingly, link 122 has a total latency of 8 s (i.e., "external segment 148+"internal" segment 150+"internal" segment 146). Assume the latency on link 122 needs to be adjusted to 10 s to harmonize the latency with that of links 124-128. The input/output calibrator 202 can then calibrate incoming and outgoing communications to switch 102/processing element 104 to adjust the overall latency of link 122 from 8 s to 10 s, consistent with the latencies of links 124-128.

Such calibration can thus account not only for the latency associated with the "external" segment 148 of link 122, but also the latencies associated with the "internal" segments 146, 150 of link 122. In some scenarios, the "external" segments 142, 154, 160 of the links 122-128 may be pre-equalized or harmonized (e.g., by adjusting one or more factors, such as the type or length of the media). In such scenarios, the latencies generated by the "internal" segments 140, 144-146, 150-152, 156-158, 162 will largely dictate the total variations between the links 122-128. Thus, the calibrations performed by the input/output calibrator 202 may be largely to equalize or harmonize latency discrepancies between the "internal" segments 140, 144-146, 150-152, 156-158, 162 of the links 122-128.

The input/output calibrators 202-208 can also perform calibrations for differentiated services (e.g., premium, basic, best effort). The controller 212 can program the starting value of each of the links 122-128 as necessary to provide differentiated services according to particular service level agreements. For example, the input/output calibrators 202-208 can calibrate communications between the customers 130-138 to have equal latencies. However, if customer 134 pays extra for a premium service, then input/output calibrator 202 may calibrate communications to and/or from customer 134 to have a lower latency than other customers 130, 132, 136, 138. Input/output calibrator 202 may lower the latency of link 122 for customer 134 relative to that of links 124-128 for customers 130, 132, 136, 138, by decreasing the total latency of link 122 and/or increasing the latencies of links 124-128.

The input/output calibrators 202-208 can dynamically train and adjust the calibrations (e.g., latencies, delays, etc.). Moreover, the delta calculator 214 can periodically re-calculate deltas and statistics for re-training the input/output calibrators 202-208. Further, as new customers join the architecture 200, that customer can be adjusted to the equilibrium point. The equilibrium point can also be re-calculated when a customer joins to make any necessary changes and program the input/output calibrators 202-208 accordingly.

The customers 130-138 can also synchronize their respective clocks based on one or more time synchronization protocols or mechanisms, such as IEEE 1588. For example, processing element 104 associated with customer 130 can include a module 216 for synchronizing clocks/time with modules 218-224 on processing elements 108, 112, 116, 120. Modules 218-224 can be configured as slave modules and module 216 can be configured as master. For example, module 216 can control the synchronization of times with modules 218-224 and can communicate with modules 218-224 to maintain the clocks on switches 106, 110, 114, 118 consistent or synchronized with the clock on switch 102. The synchronized clocks can affect communications between customers as well as the various latency calculations and calibrations.

The modules 216-224 can be software and/or hardware modules. For example, the modules 216-224 can include software code or instructions, firmware, a chip, a controller, a memory component, a processing component, a circuit, and/or any other programmable component.

Once the communications are calibrated across the various customers, the source customer 130 can communicate data and/or services with the other customers 132-138 with a net of zero (0) delta in latencies between the customers 130-138.

Figure 3:
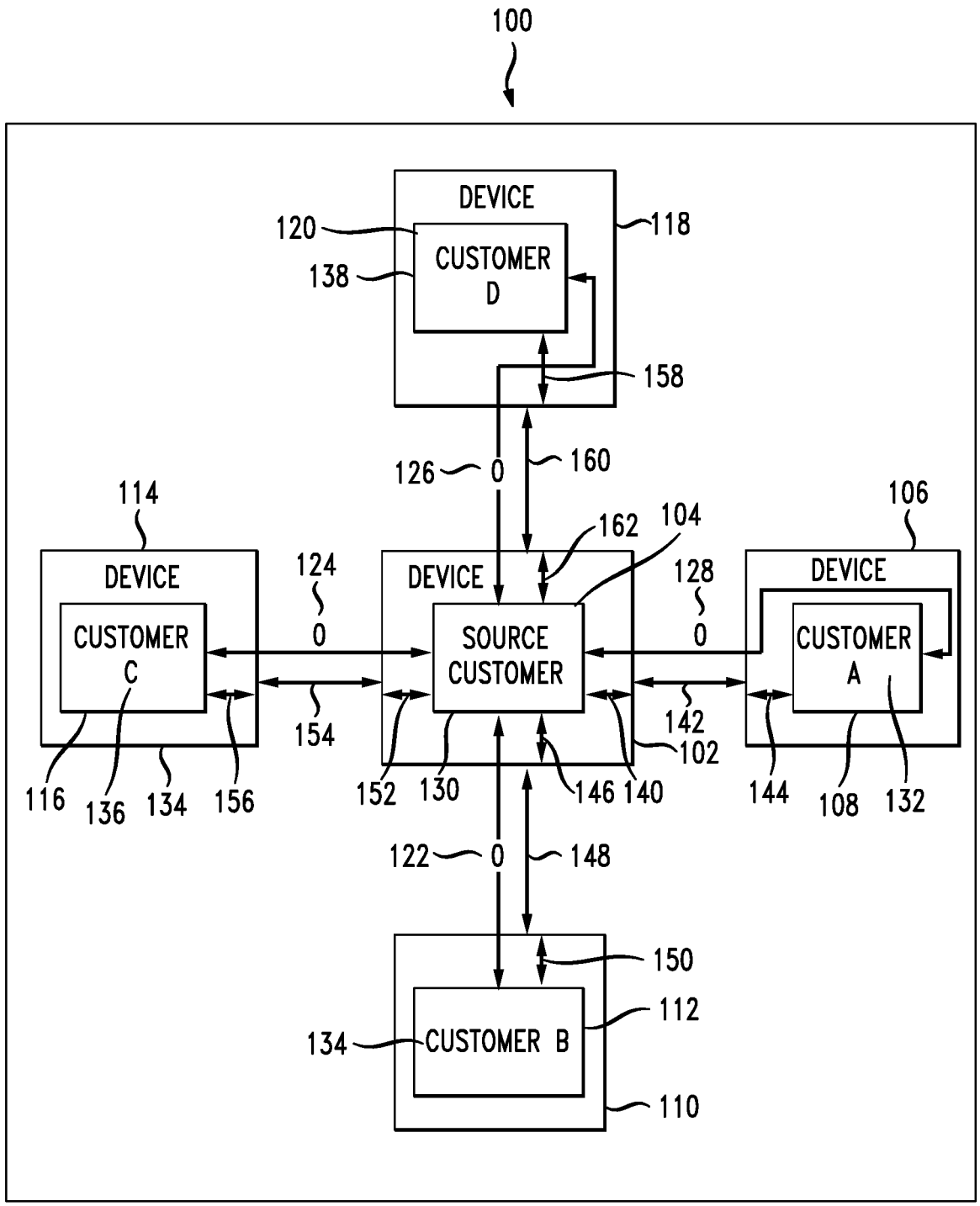
FIG. 3 illustrates a schematic diagram of an example architecture with calibrated interlinks resulting in a net of zero delta in latencies.

FIG. 3 illustrates a schematic diagram of an example architecture with calibrated interlinks resulting in a net of zero (0) delta in latencies. As illustrated, links 122-128 are all calibrated so communications over the links 122-128 all experience the same, or substantially the same, latency (i.e., zero delta). This calibrated outcome can be achieved despite any differences in cable type or size, internal latencies, latencies or differences of electrical communications, clock rate variations, etc. Thus, customers A-D can all receive data and/or services from the source customer with equal fairness in bandwidth and latency.

For example, the combined deltas between the "internal" segments 140, 144-146, 150-152, 156-158, 162 and "external" segment 142, 154, 160 for each link 122-128 can be adjusted to achieve a net zero delta between the total latencies of links 122-128. In some cases, the total latency for all of the links 122-128 may be based on the latency of the link having the greatest delay. For example, if link 122 has a total latency of 10 s, where each of links 124-128 have a total latency of less than 6 s, then a net zero latency for all links 122-128 may be achieved by increasing the latency of links 124-128 to 10 s. This can be achieved as previously explained by, for example, adjusting the delay offset and/or clock variations associated with the links 122-128.

Devices 102, 106, 110, 114, 118 are described herein as switches (e.g., Layer 2 and/or Layer 3 switches). However, this is simply for the sake of clarity and explanation purposes. Indeed, other devices are also contemplated herein, such as routers, gateways, servers, or any other network or computing devices.

Figure 4:
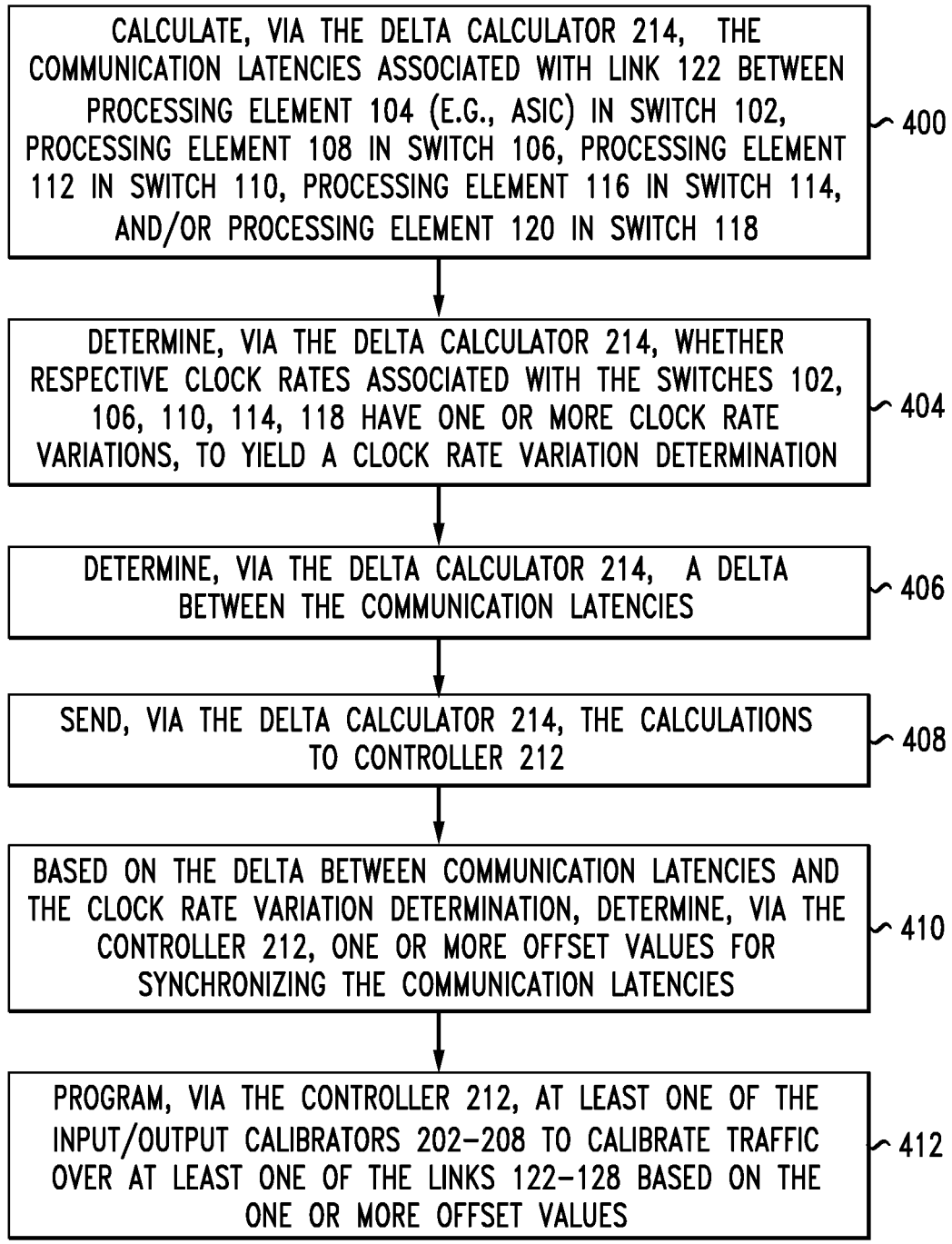
FIG. 4 illustrates an example method embodiment.

Having disclosed some basic system components and concepts, the disclosure now turns to the exemplary method embodiment shown in FIG. 4. For the sake of clarity, the method is described in terms of the architecture 200 shown in FIG. 2, configured to practice the method. The steps outlined herein are exemplary and can be implemented in any combination thereof, including combinations that exclude, add, or modify certain steps.

At step 400, the delta calculator 214 can calculate the communication latencies associated with link 122 between processing element 104 (e.g., ASIC) in switch 102, processing element 108 in switch 106, processing element 112 in switch 110, processing element 116 in switch 114, and/or processing element 120 in switch 118. The processing elements 104, 108, 112, 116, 120 can be internal components respectively within the switches 102, 106, 110, 114, 118 and/or coupled with the switches 102, 106, 110, 114, 118. For example, the processing elements 104, 108, 112, 116, 120 can include circuits, such as ASICs; controllers; processors; processing engines; software/hardware modules; etc.

Each of the links 122-128 can include multiple link segments, including "internal" segments 140, 144-146, 150-152, 156-158, 162 and "external" segments 142, 154, 160. One of the segments in a link (e.g., link 122) can be an "internal" segment, which can include the electrical path or leg between a switches' network port (e.g., ingress and/or egress port) and the processing element (e.g., ASIC) of that switch. For example, one of the segments of link 122 can be "internal" link 146, which can include an electrical path between a port on switch 102 and the processing element 104. This path can include an internal, electrical cable or wire, a bus, a circuit, an interface, a pin, etc. Another segment in a link (e.g., link 122) can be an "external" segment 148, which can include the external path or leg between the switches 102, 110, such as a fiber, copper cable, and/or wireless connection between the switches 102, 110. This external link segment can include sub-segments, which can traverse one or more devices, networks, geographic locations, etc. For example, assume switch 102 resides in California and switch 110 resides in Maryland. The "external" link segment 148 can be a fiber connection between the switch 102 in California and the switch 110 in Maryland.

A link (e.g., link 122) can have yet another "internal" segment which can be the electrical path or leg between the other switches' network port and the processing element of that switch. For example, the second "internal" segment of link 122 can be "internal" segment 150, which includes the internal path or connection between the port of switch 110 and the processing element 112 in switch 110. Thus, the entire link 122 can include the "internal" segments 146, 150 and the "external" segment 148. As previously noted, each segment can also include one or more sub-segments or hops, for example.

The communication latencies can account for all respective latencies of every link segment in the links 122-128. For example, a communication latency of link 122 can be calculated based on the round-trip time of communications between the processing element 104 and the processing element 112, including all "internal" and "external" segments. Further, in addition to calculating the communication latencies, the delta calculator 214 can determine an average latency, a minimum latency, a maximum latency, a standard deviation, etc. Moreover, the communication latencies can be based on the average latency, current latency, median, standard deviation, etc.

At step 404, the delta calculator 214 can determine whether respective clock rates associated with the switches 102, 106, 110, 114, 118 have one or more clock rate variations, to yield a clock rate variation determination. For example, the switches 102, 106, 110, 114, 118 can have internal clocks, such as crystal oscillator clocks, which the switches 102, 106, 110, 114, 118 can use to determine local time. The delta calculator 214 can analyze the internal clocks to identify any variations in the clock rates (e.g., frequencies) of the clocks. For example, the delta calculator 214 can determine the respective clock rates of the switches 102, 106, 110, 114, 118, and determine the clock rate deltas between the clocks.

The delta calculator 214 can also determine average clock rate(s), minimum clock rate(s), maximum clock rate(s), standard deviation(s), and/or other clock rate statistics. The delta calculator 214 can use such statistics for determining the delta clock rate(s) (i.e., the clock rate variation(s)). For example, the delta calculator 214 can calculate the average clock rate for each clock, and compute the delta clock rate by comparing the average clock rate of each of the clocks.

At step 406, the delta calculator 214 can determine a delta between the communication latencies. For example, the delta calculator 214 can compare the communication latencies and determine a difference between the communication latencies. In some examples, the delta calculator 214 can take any clock rate variation in consideration when determining the delta between the communication latencies. For example, the delta calculator 214 can adjust the delta to account for any variation in clock rates between the clocks associated with the switches 102, 106, 110, 114, 118. However, in other examples, the delta calculator 214 may calculate the delta without making any adjustments based on the clock rate variations.

At step 408, the delta calculator 214 can send the calculations to controller 212. The calculations can include the delta between the first and second latencies, any clock rate variations or deltas between the clocks (i.e., the clock rate variation determination), an average delta latency or clock rate, a minimum latency or clock rate, a maximum delta or clock rate, a standard deviation in latencies or clock rates, and/or other calculations and statistics. The controller 212 can receive the calculations and store and analyze the data.

At step 410, based on the delta between communication latencies and the clock rate variation determination, the controller 212 can determine one or more offset values for synchronizing the communication latencies. An offset value can define specific settings for delaying traffic to and/or from a particular link, in order to harmonize or equalize the communication latencies across the links 122-128. The offset value can take into account the delta in latencies, any clock rate variation, and/or any other calculation associated with the latencies and clock rates. For example, the offset value can be a predetermined amount of delay necessary to ensure that traffic over the links 122-128 experience the same or substantially the same latency despite the calculated delta in latencies and clock rates.

At step 412, the controller 212 can program at least one of the input/output calibrators 202-208 to calibrate traffic over at least one of the links 122-128 based on the one or more offset values. At step 416, at least one of the input/output calibrators 202-208 can then calibrate traffic over at least one of the links 122-128 based on the offset value, as configured by the controller 212. The calibration can include delaying traffic over at least one of the links 122-128 based on the offset value. The input/output calibrators 202-208 can calibrate input traffic as well as output traffic. For example, input/output calibrator 202 can calibrate communications received by processing element 104 from processing element 112, as well as communications transmitted by processing element 104 to processing element 112.

The calibration of traffic over the links 122-128 can ensure that incoming and/or outgoing communications over all of the links 122-128 experience the same or substantially the same latency. In some cases, the input/output calibrators 202-208 can calibrate traffic unevenly with the intent of providing differentiated services, such as premium, basic, best effort, etc. For example, based on a service agreement to provide premium service to customer 134, the input/output calibrator 202 can calibrate traffic over links 122-128 such that traffic over link 122 experience a lower latency than traffic over one or more of links 124-128. The amount of latency differences between customers can be based on a service agreements, for example, and may be defined in a tier level. For example, different levels can specify different latency increments for lowering a customer's latency or raising another customer's latency.

Thus, in one non-limiting example, based on one or more service agreements, customer 134 (i.e., link 122 to the source customer 130) can be calibrated to obtain a 2 ps latency, while customer 136 (i.e., link 124 to the source customer 130) is calibrated to obtain a 4 ps latency, and customer 138 (i.e., link 126 to the source customer 130) is calibrated to obtain a 5 ps latency. In some examples, the default calibration may be set to achieve equal latencies across all links, but customers may have an option to obtain differentiated services in order to adjust their latency relative to other customers.

Processing element 104 can also include a module 216 for synchronizing clocks between the switches 102, 106, 110, 114, 118 and/or processing elements 104, 108, 112, 116, 120. The module 216 can include software and/or hardware. For example, the module 216 can be a processor, controller, programmable component, circuit, etc. The processing elements 108, 112, 116, 120 can also include modules 218-224 configured to communicate with module 216 to synchronize clocks between the switches 102, 106, 110, 114, 118 and/or processing elements 104, 108, 112, 116, 120. For example, module 216 can serve as a master module and modules 218-224 can be slave modules, such that the clocks are synchronized based on the clock data provided by master module 216. The synchronized clocks can improve the accuracy of the statistics and calculations obtained for traffic to/from the various customers 130-138.

The devices 102, 106, 110, 114, 118 are described herein as switches for the sake of clarity and explanation purposes. One of ordinary skill in the art will recognize that the concepts herein apply to other devices, such as servers, routers, databases, etc. Moreover, for explanation purposes, the input/output calibrators 202-208, delta calculator 214, controller 212, and module 216 are described herein as residing in processing element 104. However, other implementations are contemplated herein. Indeed, in various examples, the input/output calibrators 202-208, delta calculator 214, controller 212, and/or module 216 can be separate from processing element 104. Further, the input/output calibrators 202-208, delta calculator 214, controller 212, and module 216 can be coupled directly or indirectly with processing element 104. Also, in some examples, the input/output calibrators 202-208, delta calculator 214, controller 212, and module 216 can reside inside or outside of the switch 102.

Figure 5:
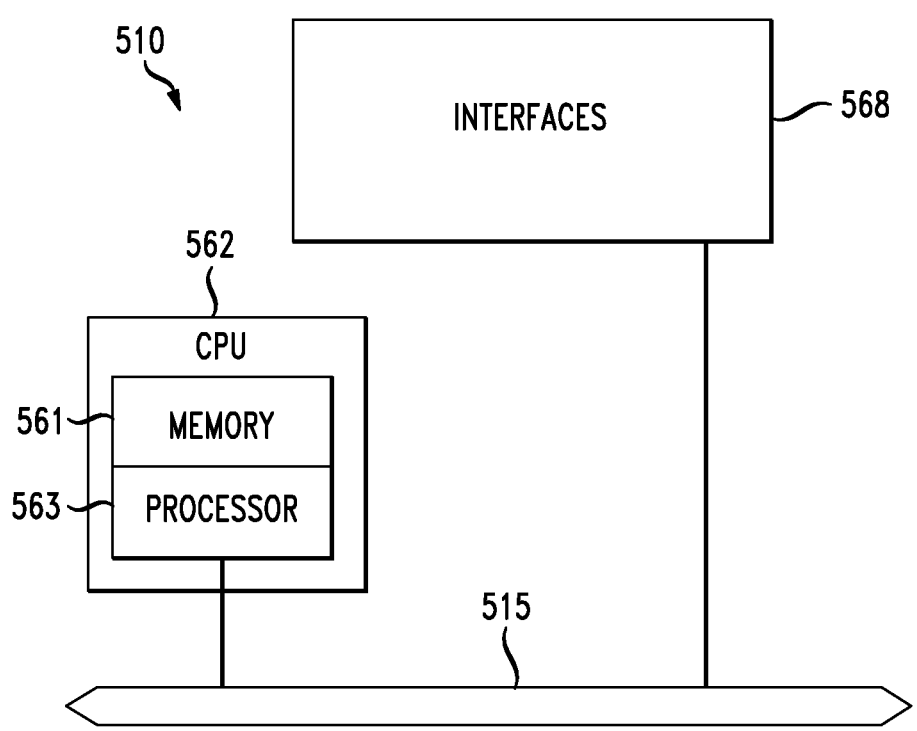
FIG. 5 illustrates an example network device.
Figure 6A:
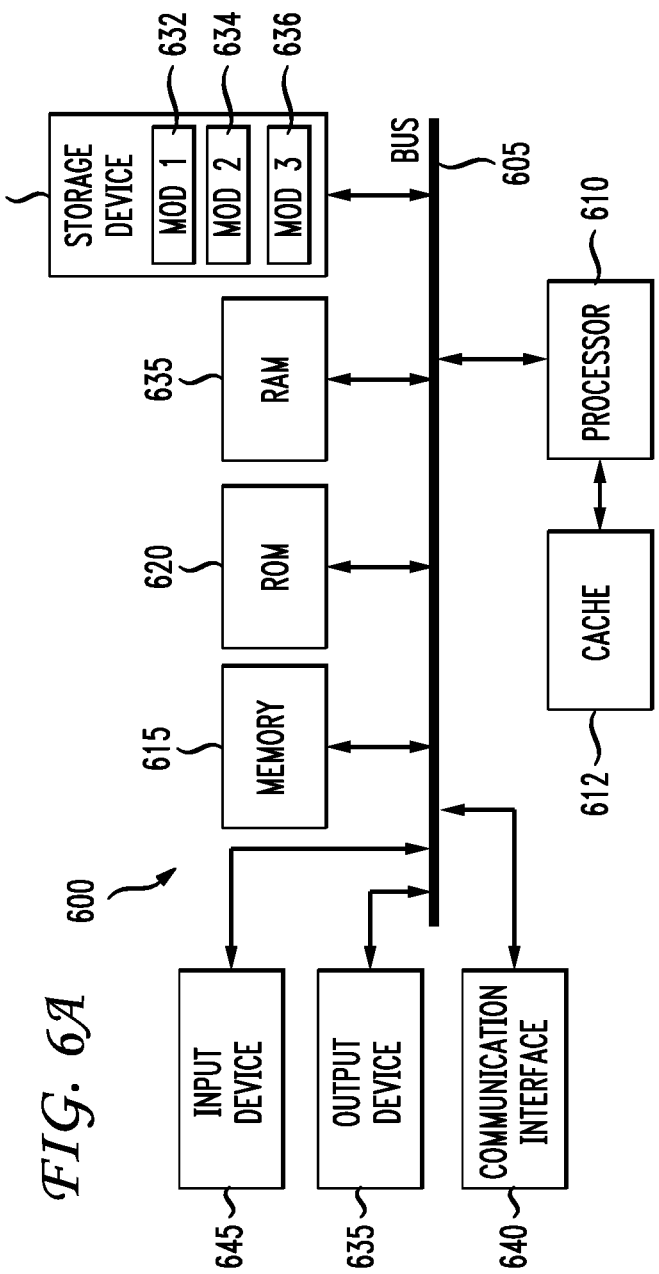
FIGS. 6A and 6B illustrate example system embodiments.
Figure 6B:
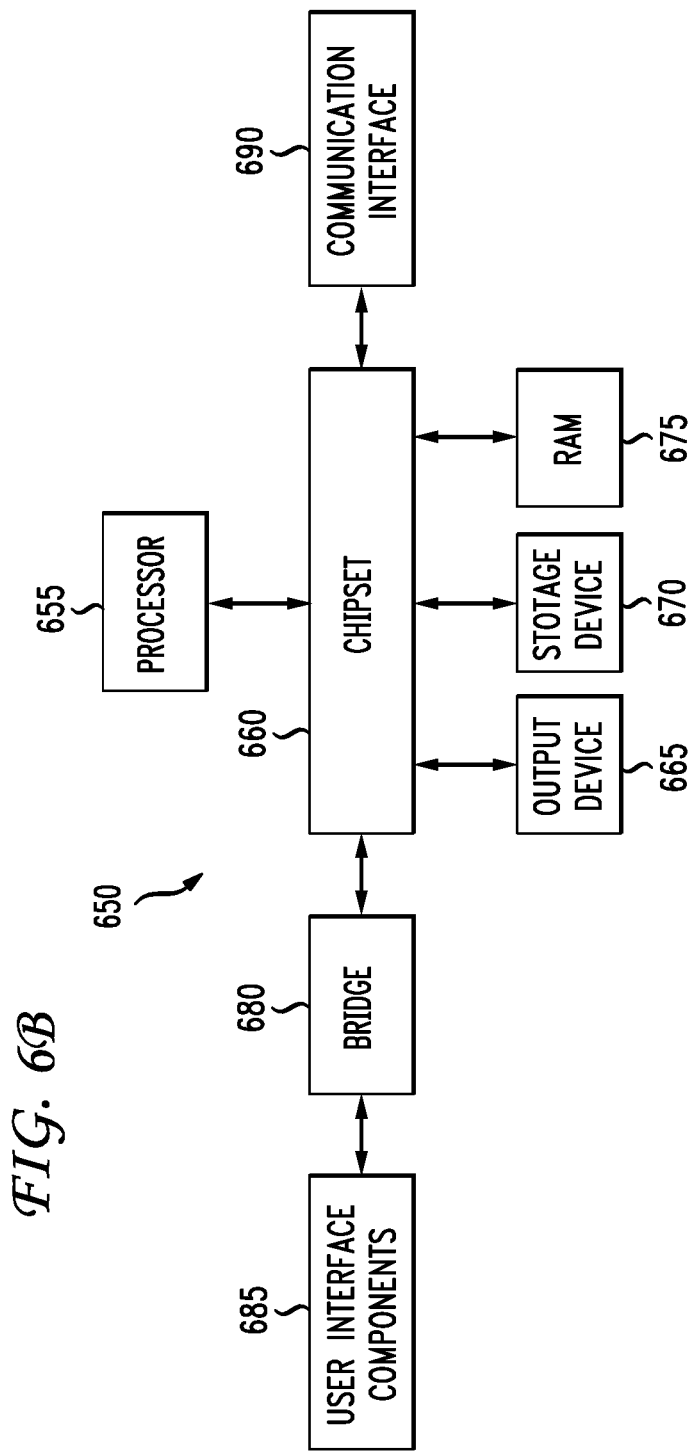

The disclosure now turns to the example network device and system of FIGS. 5 and 6A-B.

FIG. 5 illustrates an example network device 510 suitable for high availability and failover. Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing functions. The CPU 562 preferably accomplishes all these functions under the control of software including an operating system and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output device 665, such as a display, and can read and write information to storage device 670, which can include magnetic media, and solid state media, for example. Chipset 660 can also read data from and write data to RAM 675. A bridge 650 for interfacing with a variety of user interface components 655 can be provided for interfacing with chipset 660. Such user interface components 655 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 655 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Moreover, claim language reciting "at least one of" a set indicates that one member of the set or multiple members of the set satisfy the claim. For example, claim language reciting "at least one of A and B" can include A only, B only, or A and B.

What is claimed is:

1. A method comprising:
   calculating a first communication latency of a first link between a first processing element associated with a first switch and a second processing element associated with a second switch;
   calculating a second communication latency associated with a second link between the first processing element and a third processing element in a third switch;
   determining whether respective clock rates associated with the first switch, the second switch, and the third switch have a clock rate variation, to yield a clock rate variation determination;
   determining a delta between the first communication latency and the second communication latency;
   based on the delta and the clock rate variation determination, determining an offset value for synchronizing the first communication latency and the second communication latency; and
   based on the offset value, calibrating traffic over at least one of the first link and the second link by delaying at least a portion of the traffic.

2. The method of claim 1, wherein the first processing element, and the second processing element, and the third processing element comprise integrated circuits, wherein each of the first link and the second link comprise:
   a first respective path between a first port of the first switch and a respective port of the second switch and the third switch;
   a second path between the first port and the first processing element; and
   a third respective path between the respective port and the second processing element and the third processing element.

3. The method of claim 2, wherein the second path and the third respective path comprise at least one of a communications bus or an electrical connection comprising at least one of an internal link and an external link.

4. The method of claim 3, wherein the first respective path comprises at least one of a fiber cable, an electrical cable, or a wireless connection, and wherein a respective latency or length of each path in the first respective path is substantially the same.

5. The method of claim 1, wherein calibrating the traffic comprises identifying a delay value associated with at least one of the first link and the second link, the delay value for delaying traffic over the at least one of the first link and the second link based on a predetermined throughput or latency threshold.

6. The method of claim 1, wherein the first processing element is associated with a data source and the second and third processing elements are associated with data recipients.

7. The method of claim 1, further comprising:
   synchronizing respective clocks associated with the first, second, and third switches based on a precision time protocol.

8. The method of claim 1, wherein calculating the first and second communication latencies comprises determining a respective round-trip time for the first link and the second link.

9. The method of claim 1, wherein calculating the first and second communication latencies comprises calculating at least one of an average latency, a maximum latency, a minimum latency, or a standard deviation.

10. The method of claim 1, wherein determining whether respective clock rates associated with the first switch, the second switch, and the third switch have the clock rate variation comprises determining at least one of an average clock rate variation, a maximum clock rate variation, a minimum clock rate variation, or a standard deviation.

11. The method of claim 1, wherein the predetermined throughput or latency threshold is based on a service level agreement.

12. The method of claim 1, wherein calibrating traffic comprises adjusting respective latencies associated with the first link and the second link.

13. A system comprising:
one or more processors; and
one or more computer-readable storage devices having stored therein instructions which, when executed by the one or more processors, cause the one or more processors to perform operations comprising:
determining whether respective clock rates associated with the first switch, the second switch, and the third switch have a clock rate variation, to yield a clock rate variation determination;
based on a) a first communication latency of a first link between a first processing element associated with a first switch and a second processing element associated with a second switch and b) a second communication latency associated with a second link between the first processing element and a third processing element in a third switch, determining a delta between the first communication latency and the second communication latency;
based on the delta and the clock rate variation determination, determining an offset value for synchronizing the first communication latency and the second communication latency; and
based on the offset value, instructing a calibration element to calibrate traffic over at least one of the first link and the second link by delaying at least a portion of the traffic.

14. The system of claim 13, wherein the first processing element, and the second processing element, and the third processing element comprise integrated circuits, wherein each of the first link and the second link comprise:
a first respective path between a first port of the first switch and a respective port of the second switch and the third switch;
a second path between the first port and the first processing element; and
a third respective path between the respective port and the second processing element and the third processing element.

15. The system of claim 13, wherein the delta is based on a respective round-trip time of communications over the first and second respective links.

16. The system of claim 13, wherein instructing the calibration element further comprises identifying a delay value associated with at least one of the first link or the second link, the delay value for delaying communications over the at least one of the first link or the second link based on a predetermined throughput or latency threshold.

17. A non-transitory computer-readable storage medium having stored therein instructions which, when executed by one or more processors, cause the one or more processors to perform operations comprising:
calculating a first communication latency of a first link between a first processing element associated with a first switch and a second processing element associated with a second switch;
calculating a second communication latency associated with a second link between the first processing element and a third processing element in a third switch;
determining whether respective clock rates associated with the first switch, the second switch, and the third switch have a clock rate variation, to yield a clock rate variation determination;
determining a delta between the first communication latency and the second communication latency;
based on the delta and the clock rate variation determination, determining an offset value for synchronizing the first communication latency and the second communication latency; and
based on the offset value, calibrating traffic over at least one of the first link and the second link by delaying at least a portion of the traffic.

18. The non-transitory computer-readable storage medium of claim 17, wherein the first processing element, and the second processing element, and the third processing element comprise integrated circuits, wherein each of the first link and the second link comprise:
a first respective path between a first port of the first switch and a respective port of the second switch and the third switch;
a second path between the first port and the first processing element; and
a third respective path between the respective port and the second processing element and the third processing element.

19. The non-transitory computer-readable storage medium of claim 17, wherein the first and second communication latencies are based on at least one of a respective round-trip time for the first and second links, an average latency, a maximum latency, a minimum latency, or a standard deviation.

20. The non-transitory computer-readable storage medium of claim 17, storing instructions which, when executed by the one or more processors to perform operations further comprising:
synchronizing respective clocks associated with the first switch and the second switch based on a precision time protocol.

* * * * *